United States Patent Office 3,062,093
Patented Nov. 6, 1962

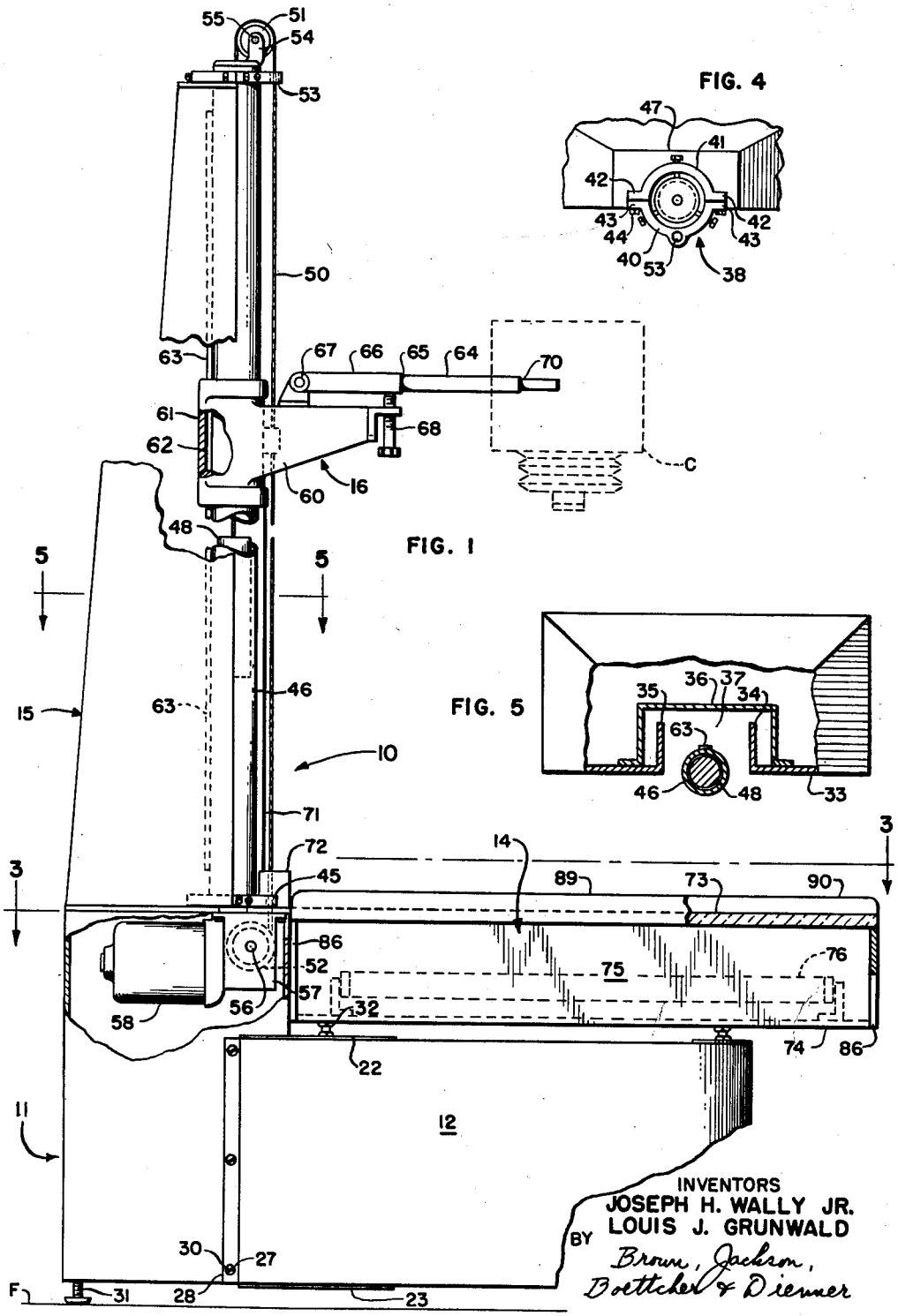

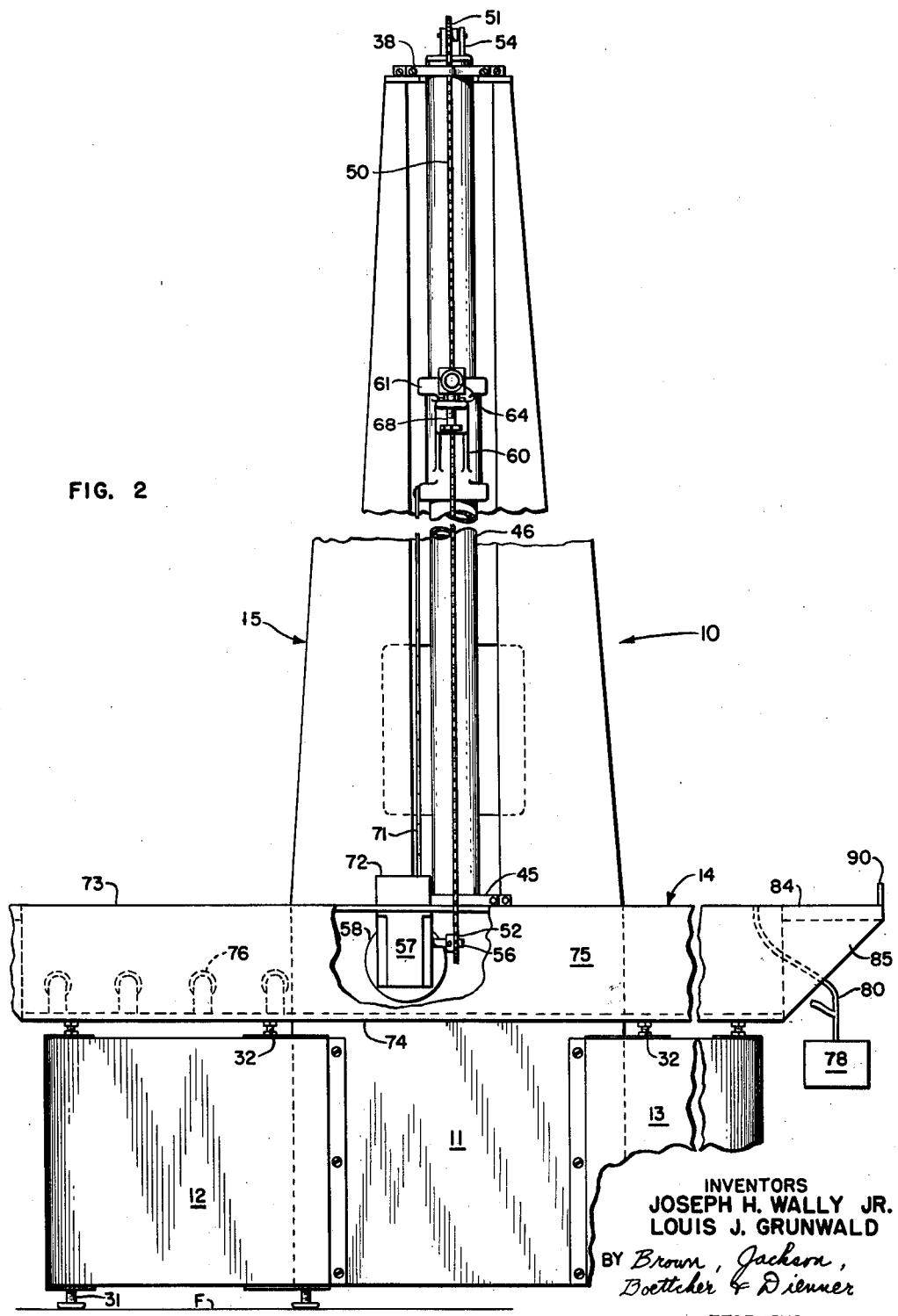

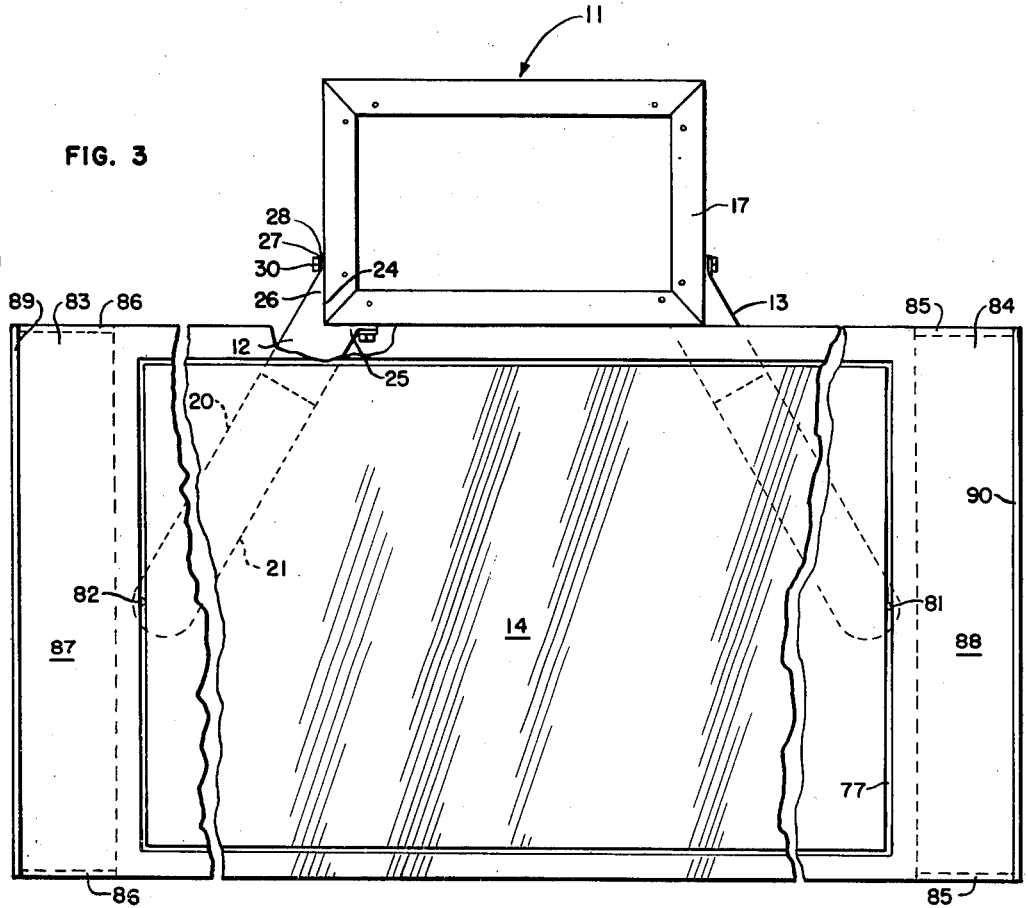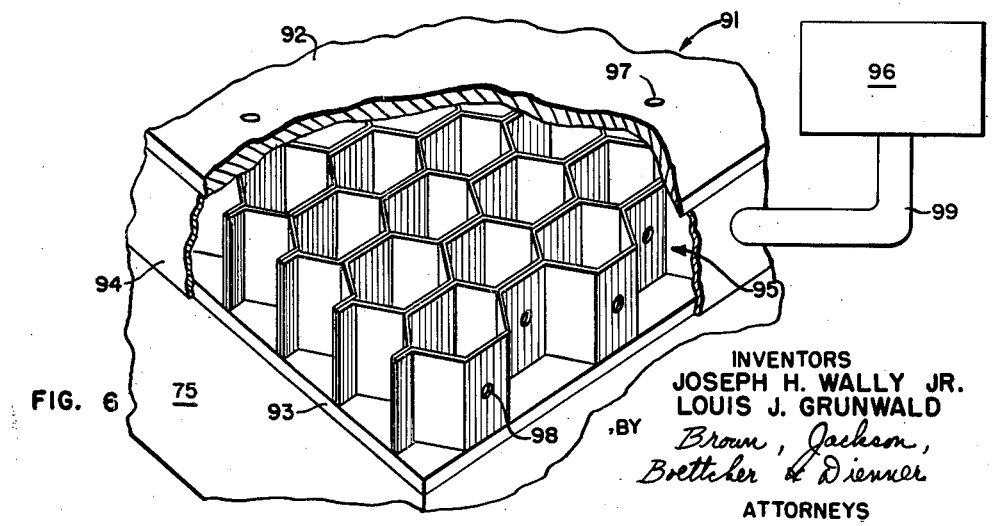

3,062,093
CAMERA SUPPORT AND SUBJECT HOLDER
Joseph H. Wally, Jr., Mission Hills, and Louis J. Grunwald, Prairie Village, Kans., assignors to Micro-Master, Inc., Kansas City, Mo., a corporation of Missouri
Filed May 22, 1958, Ser. No. 737,047
8 Claims. (Cl. 88—24)

This invention relates, in general, to photographic reproduction and in particular to a new and improved combined camera support and subject holder mechanism.

Heretofore in the reproduction of drawings and the like by photography, the lack of sharpness in the negatives has been largely attributed to optical restrictions, film quality, etc., and research and development to achieve sharp negatives has been largely along these lines. It is generally known that good resolution is mainly dependent on four factors: lens of ample capacity for process work (flat field and good resolution power); a film having the quality to resolve a detail transmitted to it by the lens (fine grain); good developing chemicals for image definition (fine grain developer); and rigidity and immobility of the entire camera support and subject holder mechanism.

We have found that the last factor plays a more important part in producing a poor quality negative than originally thought and little consideration heretofore was given to the fact that without such rigidity and immobility, the lens, the film and the developing chemicals are rendered useless.

There are numerous mechanisms for supporting the camera and the subject relative thereto but such mechanisms are defective in that they do not accomplish the necessary rigidity and immobility.

Another defect in numerous mechanisms for supporting the camera and the subject holder relative thereto has been distortion caused by mis-alignment between the plane of the film in the camera, the lens and the subject holder itself. This alignment, necessary to achieve and maintain perfect or near-perfect right angularity and fixation along a single optical axis could have been achieved only with tie-rods, braces, guy wires or other supporting means, all of which would have detracted from the general appearance. The subject invention exceeds in capacity the functional abilities of all these, and looks attractive as well. It does so without complexity, with light weight, with a structure which is easily assembled and dis-assembled, easily packed, and, because it may be simply packed when dis-assembled, and easily transported.

Accordingly, a general object of our invention is a new and improved camera support and subject holder mechanism which is an improvement over prior art structures of similar type and which will achieve rigidity and immobility yet is light in weight and will aid in securing satisfactory negatives by micro-photography having good resolution qualities and lack of distortion.

We accomplish this general object by the provision of a base with angularly disposed wing-like pedestal legs upon which a subject holder rests and an elongated pyramidal shell with a tubular supporting column therewithin resting on the base. This tubular supporting column slidably receives a supporting bracket for a planetary camera and means are provided whereby the base and the legs, the legs and the subject holder, the column with its bracket and base, each may be individually adjusted with reference to a pre-determined plane or level and to each other to provide parallel co-planar relationship between the film plane and the subject plane and perfect perpendicular relationship with these planes and the optical axis to accomplish good resolution and lack of distortion on the negative.

We have also provided in one embodiment of our invention, a new and improved subject holder made in the form of a shadow box having a translucent top surface with means provided for utilizing vacuum so that the subject may be held flat against the flat surface of the holder as a further aid in avoiding distortion or non-parallel planar relationship of the subject with the film plane.

We have also provided in another embodiment of our invention, a new and improved subject holder made of structural honey-combed sandwich-like material as a means of obtaining flatness on the top surface thereof to aid in avoiding distortion and capable of being used where desirable on the top of our shadow-box type subject holder. In this honey-combed type subject holder, means are also provided for introducing suction thereinto so that the subject may be held flat against the top surface of the holder as a further aid in avoiding distortion or non-parallel planer relationship of the subject with the film plane.

Another object of our invention is the provision of a new and improved camera supporting mechanism having a base and column support which is an elongated pyramidal hollow shell and which supports a column providing structural strength and stability.

Still another object of our invention, in a camera and subject holder supporting means, is the provision of a means for adjusting the perpendicular of the supporting column and the camera with respect to the subject holder.

Still another object of our invention is the provision of a new and improved base and column support having a pair of wing-like angularly disposed pedestal legs and the provision of means to level the base and the column.

Still another object of our invention is the provision of means, in a camera and subject holder supporting mechanism, to adjust the perpendicular of the column relative to the subject holder.

Still another object of our invention is the provision of a new and improved camera support and subject holder means for micro-photography which is light and easily detachable for shipping purposes yet is structurally durable and rigid.

Still another object of our invention is a new and improved shadow-box type subject holder having a translucent top surface whereby back lighting of a subject may be provided and incorporating means for utilizing vacuum so that the subject holder may be held flat against the top surface of the holder.

Still another object of this invention is the provision for use with a camera mechanism for micro-photography of a new and improved subject holder which is light and flat and which will provide parallel co-planar relationship with the film plane of the camera.

Still another object of our invention is the provision of a new and improved subject holder in a camera supporting mechanism for micro-photography utilizing vacuum to retain the subject against a flat surface of the subject holder thereof to provide for extreme flatness and parallel relationship with the film holder.

Other objects and advantages of our present invention will be apparent from the following detailed description taken in conjunction with the drawings. For example, we have found that by the substitution of a projector for the camera, the support and subject holder may be used for projecting negatives and the like on the subject holder where a drawing or the like may be traced or otherwise reproduced.

In the drawings:

FIG. 1 is a side view, partially broken away, showing to advantage the camera and subject holder supporting mechanism constructed according to the teachings of our present invention;

FIG. 2 is a front view, partially broken away, showing to advantage the camera and subject holder supporting mechanism shown in FIG. 1;

FIG. 3 is a view taken along lines 3—3 of FIG. 1 and looking in the direction of the arrows illustrating to advantage the base, the wing-like pedestal legs, and the means of angularly attaching the legs to the base, certain motor and drive mechanism in the base being omitted;

FIG. 4 is an enlarged, detailed, plan view illustrating to advantage one of the coupling means for adjusting the column;

FIG. 5 is a cross-sectional plan view taken along lines 5—5 of FIG. 1 showing to advantage the cross-section of the shell and supporting member; and FIG. 6 is a fragmentary perspective view, partially broken away, showing to advantage the internal structure of the honey-comb type subject holder forming another embodiment of our invention.

Turning now to the drawings and particularly FIGS. 1, 2 and 3, there is illustrated in detail our camera base and column support indicated in its entirety as 10, which comprises a base, indicated in its entirety as 11, having a pair of wing-like pedestal legs 12 and 13, detachably affixed to the base and extending at an angle therefrom, and which adjustably support a shadow box type subject holder 14. A column, indicated in its entirety as 15, detachably supported on the top of base 11, substantially normal to the legs 12 and 13, supports a slidable camera head support 16 for a planetary camera C.

Base 11 is formed with four substantially parallel sides of relatively flat material, such as sheet steel or the like, rectangular in cross-section (see FIG. 3), and having a plurality of inwardly extending upper flanges 17. Similar flanges (not shown) are on the bottom of the base. Wing-like legs 12 and 13 each are formed of relatively flat material, such as sheet steel or the like, with elongated parallel sides 20 and 21 partially closed at the top and at the bottom by sides 22 and 23 and curved at one end (see FIG. 3). Each leg is further provided with a right angular recess 24 from which extends a pair of flanges 25 and 26. Flanges 25 and 26 are suitably apertured as at 27 to complement similar apertures 28 in base 11 throughout their lengths to receive attaching means, such as the nut and bolt assemblies 30, to attachably fix the same to the base 11. Wing-like legs, in the embodiment shown, are angularly disposed with respect to the sides of the base 11 to form a support for the column 15 and for the shadow box type subject holder 14 later to be described in detail.

In the embodiment shown, four adjusting means 31 of the conventional set screw type are provided, two on the bottom of the base and one on each of the wing-like legs 12 and 13, to provide suitable adjustment with the floor F. At the top of each wing-like leg 12 and 13, there is provided a pair of set screw adjusting means 32, which adjustably support the shadow box type subject holder 14. By suitably adjusting the set screws 31 and the set screws 32, horizontal adjustment of the subject holder 14 and vertical adjustment of the column 15 may be accomplished. If desired, an additional piece of metal or the like may be added under the various adjusting screws for strengthening purposes.

Column 15 comprises a hollow, four-sided shell 33, large at the bottom and narrow at the top, forming an oblique elongated pyramid of relatively flat material, such as sheet steel or the like, rectangular in overall cross-section with one side (facing subject holder 14) perpendicular to the floor F. In the embodiment shown, the shell 33 is provided with a pair of flanges 34 and 35 turned inwardly to face a channel-like second piece 36 of relatively flat material of sheet steel or the like, U-shaped in cross-section, suitably affixed to the shell to form an enclosure 37 generally U-shaped in cross-section as shown in FIG. 5; flanges 34, 35 being added for strengthening purposes.

At the top of the shell 33, there is provided a substantially circular shaped split collar member, indicated in its entirety as 38, formed of two U-shaped halves 40 and 41 each having a pair of radially outwardly extending flanges 42 and 43 which are suitably bored and complementarily threaded to receive attaching means, such as screws 44. Half 41 of collar member 38 is permanently affixed to the top of the shell 33 by any suitable means such as welding. A similar collar member, indicated in its entirety as 45, is also suitably and permanently affixed to the lower portion of the shell 33 by welding. Since collar member 45 is identical with collar member 38, no further description is necessary. A hollow tubular member 46 is held within the collar 38 by a plurality of set screws 47 disposed at an angle with each other to triangulate the tubular member 46 therewithin at the top of the column. Collar 45 has similar set screws to triangulate the tubular member 46 at the lower end thereof. Tubular member 46, being hollow, conveniently receives a counter-weight 48 affixed to a continuous roller chain 50 to counter-balance the camera head support 16 affixed to the opposite ends of the continuous chain. Chain 50 is disposed about a pair of sprockets 51 and 52 and is freely movable within an aperture 53 in collar member 38; sprocket 51 being located at the top of the column 15 above the collar 38, sprocket 52 being located at the bottom of the column below the collar 45 which has an aperture similar to aperture 53. A suitable bracket 54 to rotatably support the sprocket 51 on shaft 55, is conveniently affixed to the top of the column and sprocket 52 is rotatably mounted on a shaft 56 forming part of a gear reduction unit 57 driven by electric motor 58. Rotation of the sprocket 52 by the motor will raise or lower the camera supporting head 16 to any convenient location relative to the column 15.

Camera support head 16 comprises triangularly shaped bracket 60 of a metal casting or the like having a vertical circular bore or hole 61 to slidably receive the tubular member 46 and is further provided with a vertical slot 62 opening into the bore 61 to receive a rib or keyway 63 attached to the rear of the tubular member column 46 by any suitable means. The slot 62 and rib 63 prevent rotatable horizontal movement of the bracket 60. A horizontally outwardly extending mounting bar means 64 is received in a horizontal bore 65 of an adjustable arm 66 hingedly mounted as at 67 to the top of bracket 60 to adjustably affix the bar 64 to the bracket 60. Suitable screw means 68 is provided to adjust the arm 66 and bar 64, and a shoulder 70 may be provided on the bar near the outer end thereof by reducing the diameter of the bar on which the camera is slidably received.

Means, such as a properly indexed self-returning tape 71 in box 72, may be provided at the top of the base 11 and connected with the supporting bracket 60, to indicate the height of the camera for focus calculations.

The shadow box 14, adjustably supported on wing-like legs 12 and 13, hereinbefore described, comprises a table-like structure having a flat top side 73 and a flat bottom side 74, separated by four sides 75 to form a right-angular hollow parallelopiped. Top side 73, intended to be translucent, may be made of a sheet of thick frosted plate glass, or other translucent material, for the diffusion of background light from a plurality of fluorescent tubes 76 within the shadow box 14. The flat top side 73 of the shadow box type subject holder 14 is provided with a relatively thin, relatively shallow peripheral groove 77 formed near the margins of the top side and, in the embodiment shown, are interconnected to form a rectangle. Grooves 77 is placed in communication with a vacuum pump 78 by flexible tubing or the like 80, connected at one end with the vacuum pump and the other end with apertures 81 and 82 formed in the top side 73. With this arrangement, it can be seen that by the use of a translucent acetate sheet material, generally of a size larger than the rectangle formed by groove 77, a drawing or the like, or light sensitive paper, as the case may be, may be held rigidly and flat against the top surface by the vacuum that is created by the acetate and the peripheral groove 77. The acetate may be conveniently taped at one end of the subject holder 14, leaving three sides open so that the drawing may be easily inserted between the acetate and the top side, and suitable extensions 83 and 84 may be provided on the opposite ends of the shadow box subject holder, as illustrated in FIGS. 2 and 3. The extensions each comprise a pair of triangular supporting end plates 85 and 86 supporting a top plate 87 and 88. Furthermore, if desirable, retaining plates 89 and 90 may be provided at each end of these extensions to aid in centering the drawings, etc.

From the above arrangement, it can be seen that the drawing or the like, which is to be reproduced by the camera, may be front-lighted by an arrangement of suitable lights over the subject holder directed at the drawing and back-lighted by the arrangement of fluorescent lights 76 within the shadow box. This ability to back-light and front-light has been found very desirable in the photographic reproduction of drawings which are otherwise difficult to reproduce.

Turning now to FIG. 6 of the drawings, there is illustrated a honey-comb type subject holder, indicated in its entirety as 91, supported on the shadow box type holder 75 and comprising a relatively thin, table-top like structure having a flat top side 92 and a flat bottom side 93, separated by a plurality of relatively thin and narrow side walls 94 enclosing a plurality of honey-combed reinforcing ribs indicated in their entirety as 95. The internal structure of this honey-combed subject holder 91 is preferably air-tight throughout and, in one application of our invention, the top side 92 is in communication with a conventional suction type blower 96; communication being effected by a plurality of apertures 97 in the top side 92 as illustrated in FIG. 6 and apertures 98 in the honey-combed ribs to a relatively large flexible pipe 99. It is to be noted that the honey-comb structure rigidly supports the top of the honey-comb subject holder and prevents it from buckling or bending under suction and enables the subject holder to support its own weight whether vertically or horizontally. With this construction, a translucent acetate paper material may be used to hold a drawing or the like against the top side in a manner described in connection with the shadow box type subject holder 75 except that, with this arrangement, back-lighting of the drawing to be reproduced is impossible. However, this type of subject holder for certain applications may be useful and may be easily supported on top of the shadow box 75 or directly upon the legs 12 and 13 as desired. If supported on the shadow box type subject holder 14, then it is only necessary for the honey-comb box to be tilted vertically to use the back-lighting arrangement. Furthermore, the honey-comb type subject holder may itself be provided with retaining plates such as plates 89 and 90 of subject holder 14, if desired.

From the above description, it can be seen that we have provided a new and improved combined camera support and subject holder which is structurally rigid and durable and yet light-weight and detachable for mobility purposes. The wing-like legs 12 and 13 and the subject holder 14 or 91 may be conveniently transported in a relatively thin, relatively flat box and the base 11 and column 15 with outer shell 33 may also be shipped in a relatively long, narrow box as convenient.

Also, from the above description, it is apparent that we can use our combined camera support and subject holder as a projector by the substitution of a projector for the camera C. Thus, an accurate reproduction of a drawing or the like can be projected on the subject holder 14 or 91 on which a draftsman could trace the reproduction as desired.

In setting up our combined camera and support holder, we have found it convenient to utilize an optical tooling transit to provide a true vertical adjustment of the camera, such adjustment being approximated by the set screws 31 on the wing-like legs 12 and 13 and base 11 and any final adjustments may conveniently be made by the set screws in the collars 38 and 45 at the top and bottom. With horizontal adjustment of the subject holder 14, accurate alignment of the film plane and the subject holder and normal alignment of the optical axis can easily be accomplished.

Wherein the various parts of our invention have been referred to as located in a right or left or upper or lower, an inward or outward position, it will be understood that this is done solely for the purpose of facilitating description and such references relate only to the relative positions of the parts as shown in the accompanying drawings. Also, it will be understood that this is done solely for the purpose of facilitating description and such references relate only to the relative positions of the parts as shown in the accompanying drawings. Also, it will be understood that many changes and modifications may be made to the embodiment described herein without departing from the spirit or scope of the invention which is comprehended solely by the appended claims which should be given a scope consistent with the prior art.

We claim:

1. A demountable, readily transportable combined support for an optical image-transmitting means and subject holder comprising, a base, a pair of angularly disposed wing-like legs detachably affixed to said base, means to adjust the level of said base and legs, a sheet holder detachably supported on said legs, means to adjust the position of said sheet holder with respect to said wing-like legs, a column detachably mounted on said base comprising an elongated pyramidal shell, a tube mounted in said shell, means to adjust the tube relative to said base and said sheet holder, a support slidably mounted on said tube for said optical image-transmitting means, and means to adjust the position of said support with respect to said sheet holder.

2. A demountable, readily transportable combined support for an optical image-transmitting means and subject holder comprising a base, a column detachably mounted on said base, subject holder supporting means affixed to the forward side of said base, means to adjust the level of said base and said supporting means, a subject holder supported to one side of said column and on the subject holder supporting means, and means to adjust the subject holder with respect to said supporting means, said column detachably mounted on said base comprising an elongate pyramidal shell broad at the bottom and tapered to become narrow at the top, vertically extending tube-like means, said shell partially enclosing said tube-like means, and supporting means near the top and bottom of said tube-like means immobilly securing said tube-like means relative thereto, said supporting means being adjustable to allow perpendicular adjustment of said tube-like means with respect to said subject holder, the support for the optical image-transmitting means being mounted on said tube-like means, and means to vertically adjust the position of said support on said tube-like means with respect to said subject holder.

3. A combined support and subject holder as claimed in claim 2 further characterized by said subject holder supporting means being angularly disposed wing-like pedestal legs detachably affixed to the forward side of said base.

4. A combined support for an optical image-transmitting means and a sheet holder comprising a base, holder means for supporting and holding sheet material, a supporting column mounted on said base normal to said sheet holder means, vertically extending tube means supported within said column adjacent its ends, a support means for said optical image-transmitting means carried by said tube means, means to adjust the base relative to a predetermined plane, means for adjusting the sheet holder means relative to said plane, means for adjusting the ends of said tube means relative to the column and transversely to said plane, and means to vertically adjust said image transmitting means.

5. A combined support for an optical image-transmitting means and a sheet holder comprising means including a base, a pair of wing-like legs detachably affixed to the forward end portion of said base, a sheet holder means comprised of a member having a top on which a sheet may be positioned, a column detachably mounted on said base comprising an elongate pyramidal shell, said shell being large at the base and tapering to a narrow portion at the top, a tube vertically mounted in said shell and having its ends supported at the ends of said shell, an optical image-transmitting means support slidably mounted on said tube, means for adjusting the base relative to a predetermined plane, means for adjusting the sheet holder means relative to said plane, and means near the top and bottom of said tube for transversely adjusting said tube relative to said plane.

6. The combination claimed in claim 4 wherein said sheet holder means comprises a translucent top and having means beneath said top for back lighting the same.

7. In a combined support for an optical image-transmitting means and sheet holder means for supporting and holding a sheet, an elongate, vertically extending pyramidal shell broad at the bottom and tapered to be narrow at the top, a vertically extending tube within said shell, support means near the top and bottom of the tube for securing said tube immobile relative to said shell, support means for said optical image-transmitting means mounted on said tube for vertical movement to and away from said sheet holder means to focus said optical image-transmitting means on said sheet holder means, and said supporting means near the top and bottom of the tube being adjustable for transversely adjusting said tube relative to the supporting plane of the sheet holder.

8. A support and subject holder for an optical image-transmitting means comprising a rectangular shaped base, a pair of wing-like legs attached to the corners of the forward side of said base, and extending outwardly at diverging angles from each other, said base and said legs having spaced vertical adjusting means on the bottom side thereof, an easel horizontally disposed across the upper surface of said legs, spaced adjusting means between the top of said legs and the bottom of said easel for vertical adjustment of said easel, said adjusting means on said base, legs and easel co-operating to horizontally level said easel, a hollow, four-sided rectangular cross-sectional shell large at the bottom and narrow at the top, forming an oblique elongate pyramid of sheet material having its front side recessed, mounted on the upper surface of said base to one side of said easel, a vertically extending tube mounted within the recess of said shell and connected to the upper and lower ends of said shell, adjustment means near the upper and lower ends of said tube for individual adjustment of said ends of the tube within a horizontal plane, a supporting arm mounted on said tube for supporting an optical image-transmitting means over the easel, said supporting arm being adapted for vertical adjustment on said tube with respect to said easel, and said adjustment means on said tube, base, legs and easel co-operating to provide parallel coplanar relationship between a film plane within the image-transmitting means and the easel plane.

References Cited in the file of this patent

UNITED STATES PATENTS

| | | |
|---|---|---|
| 1,840,468 | Riddell | Jan. 12, 1932 |
| 2,300,264 | Morin | Oct. 27, 1942 |
| 2,317,348 | Wekeman | Apr. 27, 1943 |
| 2,379,279 | Costello | June 26, 1945 |
| 2,415,424 | Gaebel | Feb. 11, 1947 |
| 2,596,811 | Carlson | May 13, 1952 |
| 2,607,265 | Petrucelli | Aug. 19, 1952 |
| 2,645,153 | Halpern | July 14, 1953 |
| 2,673,487 | Bumstead | Mar. 30, 1954 |
| 2,777,372 | McNutt | Jan. 15, 1957 |

FOREIGN PATENTS

| | | |
|---|---|---|
| 971,776 | France | Aug. 16, 1950 |
| 1,059,093 | France | Nov. 10, 1953 |